(12) United States Patent
Borg et al.

(10) Patent No.: US 8,607,377 B2
(45) Date of Patent: Dec. 17, 2013

(54) WATER COLLECTION AND DISTRIBUTION MONITORING SYSTEM AND METHODS

(75) Inventors: Dustin Borg, Poway, CA (US); Mark Gutting-Kilzer, Des Plaines, IL (US); Xu Wang, Franklin Park, IL (US)

(73) Assignee: Sloan Valve Company, Franklin Park, IL (US)

( * ) Notice: Subject to any disclaimer, the term of this patent is extended or adjusted under 35 U.S.C. 154(b) by 84 days.

(21) Appl. No.: 13/298,244

(22) Filed: Nov. 16, 2011

(65) Prior Publication Data

US 2012/0125443 A1 May 24, 2012

Related U.S. Application Data

(60) Provisional application No. 61/414,386, filed on Nov. 16, 2010.

(51) Int. Cl.
*A47K 4/00* (2006.01)

(52) U.S. Cl.
USPC .............................................................. 4/665

(58) Field of Classification Search
USPC ..................................................... 4/665, 661
See application file for complete search history.

(56) References Cited

U.S. PATENT DOCUMENTS

| | | |
|---|---|---|
| 3,112,497 A | 12/1963 | Call |
| 4,162,218 A | 7/1979 | McCormick |
| 5,084,920 A | 2/1992 | Kimball |
| 5,201,082 A | 4/1993 | Rockwell |
| 5,243,719 A | 9/1993 | McDonald et al. |
| 5,251,346 A | 10/1993 | Donati |
| 5,303,728 A | 4/1994 | Senatore |
| 5,317,766 A | 6/1994 | McDonald et al. |
| 5,341,529 A | 8/1994 | Serrano |
| 5,406,657 A | 4/1995 | Donati |
| 5,498,330 A | 3/1996 | Delle Cave |
| 5,937,455 A | 8/1999 | Donati |
| 6,276,005 B1 | 8/2001 | Sanders et al. |
| 6,328,882 B1 | 12/2001 | Rosenblatt |
| 7,121,292 B2 | 10/2006 | Aylward et al. |
| 2006/0144769 A1 | 7/2006 | Okros |

FOREIGN PATENT DOCUMENTS

| | | | |
|---|---|---|---|
| JP | 11-050507 A | | 2/1999 |
| JP | 11050507 A | * | 2/1999 |
| JP | 2006-077531 | | 3/2006 |
| KR | 10-2001-0012054 | | 2/2001 |
| KR | 1020010012054 A | * | 2/2001 |
| KR | 10-2003-0031038 | | 4/2003 |
| KR | 10-2009-0040015 | | 4/2009 |

OTHER PUBLICATIONS

International Search Report and Written Opinion for PCT/US2011/061072, issued May 29, 2012.
Second Written Opinion of the International Preliminary Examining Authority Based on the Article 34 Amendment Filed on Oct. 9, 2012, Issued Nov. 28, 2012, 5 pages.

* cited by examiner

*Primary Examiner* — Lori Baker
(74) *Attorney, Agent, or Firm* — Foley & Lardner LLP

(57) ABSTRACT

The invention relates to a grey water reclamation system and methods therefor. Grey water is captured from a source, such as a sink, and stored in a main body containing a pump. The grey water is transported to a flush tank for use with a toilet. The system provides for use of a mixture of fresh water and grey water without interrupting the service to the user. Usage of grey water is maximized without completely eliminating the fresh water as a component that ensures service when grey water is unavailable.

17 Claims, 8 Drawing Sheets

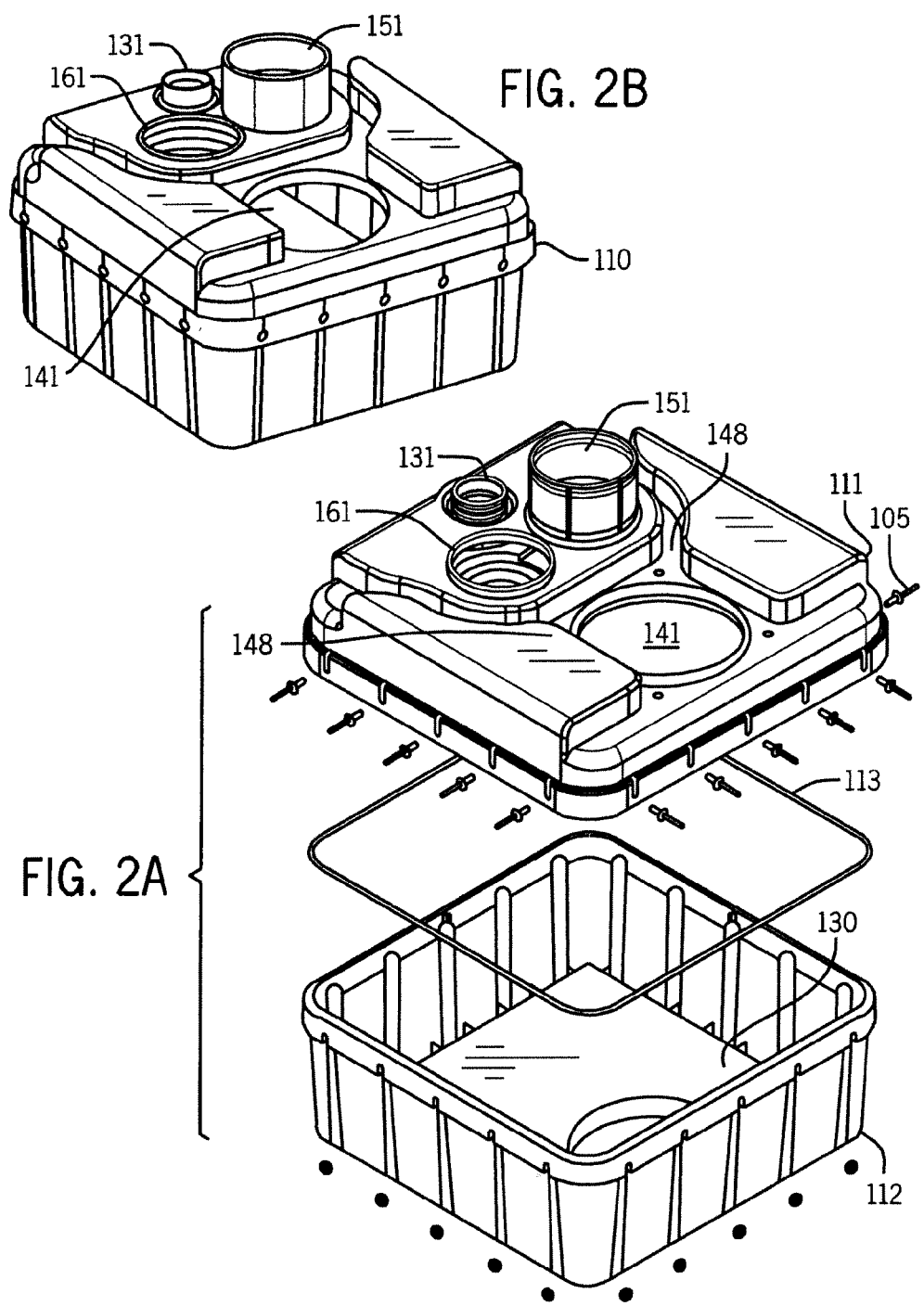

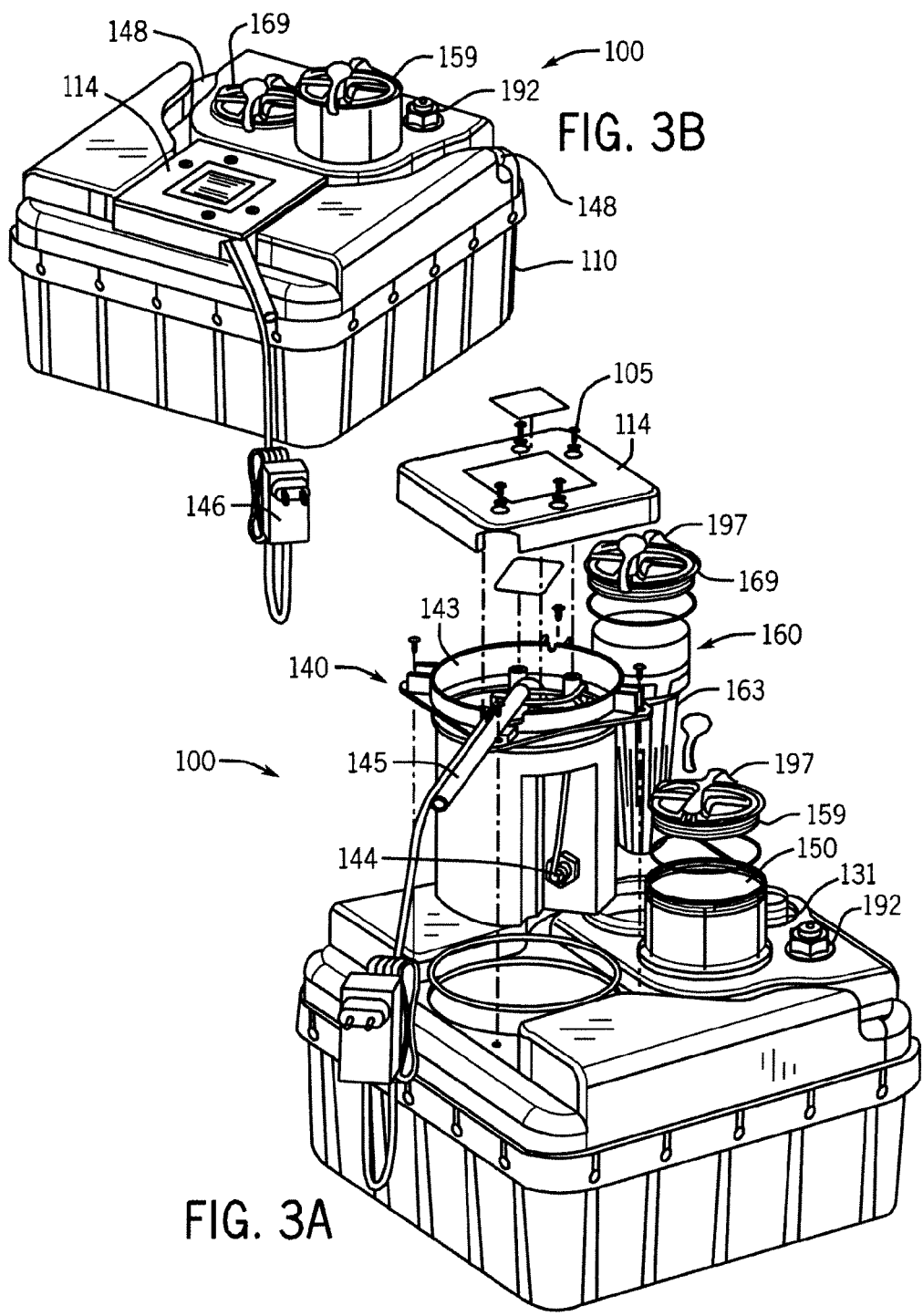

WATER COLLECTION AND DISTRIBUTION MONITORING SYSTEM AND METHODS

CROSS-REFERENCE TO RELATED APPLICATIONS

This application claims priority to U.S. Provisional Patent Application No. 61/414,386, filed Nov. 16, 2010, the contents of which are herein incorporated by reference in its entirety.

FIELD OF THE INVENTION

The present invention relates generally to the field of water conservation. More specifically, the present invention relates to a system and method for collection and distribution of grey water.

BACKGROUND OF THE INVENTION

Water consumption has become an issue in many areas of the world. As such, increasing attention has been paid to how fresh potable water is used. One type of technology that has developed is grey water treatment systems. Grey water treatment systems reuse a portion of the water that would otherwise have gone directly into the waste water collection system. Grey water is generally water that is no longer potable (typically referred to as "white water") due to usage, but which is not yet so contaminated that it is considered "black water", which is generally polluted with biological or chemical hazardous materials. Grey water typically is generated by the bath/shower, bathroom sinks, and washing machines. Although they may produce grey water at times, generally kitchen sinks and dishwashers are considered to generate black water, due to the high level of food particulates and the possibility of contamination. In addition, it should be appreciated that certain activities may result in the generation of black water in an area that otherwise may typically generate grey water, such as the washing of dirty diapers in a washing machine.

Systems have been provided to collect and distribute grey water in a residential environment. However, current residential grey water systems often ineffectively use the grey water resulting in a lower savings in potable water than ideal. Prior inventions have adopted varying complexity of harvesting residential wastewater (see, e.g., U.S. Pat. Nos. 3,112,497, 4,162,218, 5,084,920, 5,201,082, 5,251,446, 5,243,719, 5,303,728, 5,319,766, 5,341,529, 5,406,657, 5,498,330, 5,937,455, 6,276,005, 6,328,882, 7,121,292, and current U.S. application 20060144769) and reusing that water for other uses such as flushing toilets. In all prior art, the inventors have been preoccupied with maximizing the harvesting aspects of the water from all practical available sources. This has caused the various inventions to be overly complex and complicated to deploy and maintain. More complicated systems with multiple storage reservoirs to anticipate all possible volumes of storage have the problems of more complexity. Prior art overly complicates the collection system aspects of a small grey water reuse system. Prior art also treats each drop of the grey water as if it needs to be harvested and used totally thus overcomplicating the system. Prior art does not make use of any electronic control points in order to allow monitoring and safeguarding of the system.

U.S. Pat. No. 6,276,005 issued to Sanders describes one such concept but with some shortcomings. The determination of grey water addition to the gravity fixture is accomplished by some simple water level logic switches and mechanical levers pivoting within the gravity tank. The microswitch is also very sensitive to small adjustments and can be overly difficult to adjust for the maximum flow of grey water into the gravity tank. The microswitch within the gravity tank can become problematic because of the high humidity environment it operates within. With high chlorinated water (chlorinated by design of the invention) the switch will become corroded and inoperable. The mechanical translation of pivoting levers in the tank can become stuck because of biological growth on them from the water they are floating in.

There is a need for a grey water system that is compact, easy to install, allows for monitoring logic with simple signals, and is low maintenance.

SUMMARY OF THE INVENTION

This invention relates to a grey water reclamation system that is easily retrofitted to a residential gravity toilet and sink vanity in a normal toilet room layout. The invention allows capturing quantities of sink basin water, channeling that captured water through some filtering mechanisms, transporting that filtered water to a nearby gravity toilet, and maximizing the use of the grey water while minimizing fresh water in the flushing operation of the gravity tank fixture. In today's world many good intentioned water conservationists want to quantify the amount of water they saved by using supplemental grey water to flush gravity toilets.

Further, the invention contemplates affordable small scale grey water collection, treatment, and reuse within a small envelope of a few dozen feet. This invention also is directed to compactness of the retrofit installation by designing novel water passages that overcome tight installations. This invention improves upon prior art deficiencies and adds logic of system dynamics and system effectiveness by processing simple signals within the system to report or alarm system elements.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2A illustrates an exploded view of one embodiment of the main assembly of a grey water system; FIG. 2B illustrates the main assembly of FIG. 2A in perspective view.

FIG. 3A illustrates an exploded view of one embodiment of the main assembly and components engaging therewith of a grey water system; FIG. 3B illustrates the main assembly and components of FIG. 3A in perspective view.

DETAILED DESCRIPTION OF THE PREFERRED EMBODIMENTS

Figure 1:
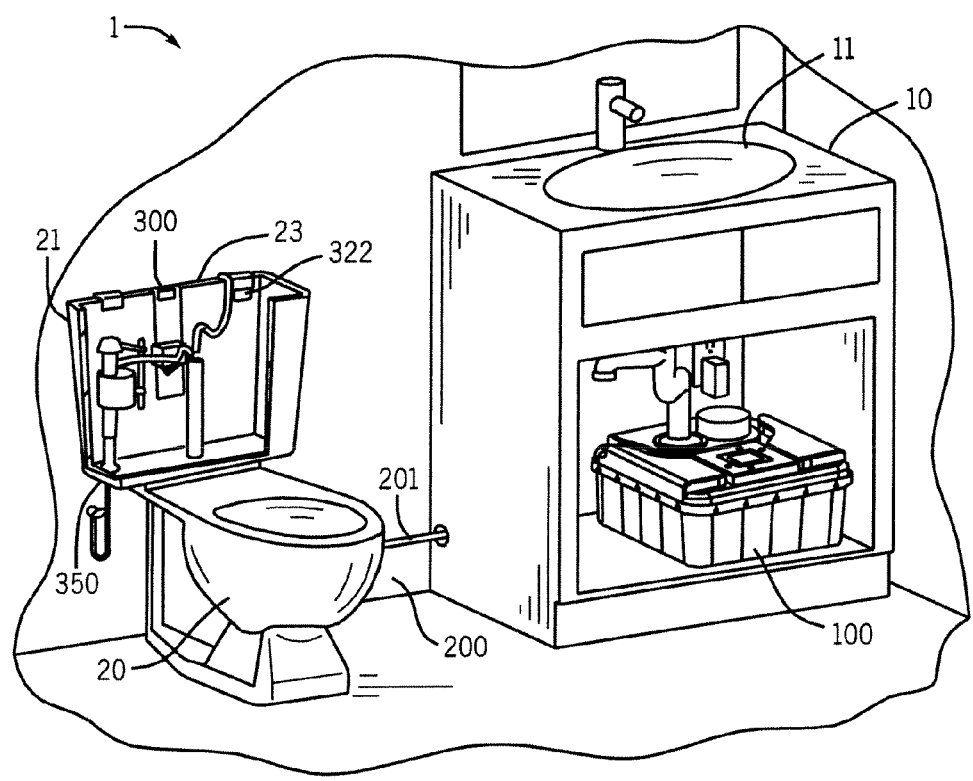
FIG. 1 illustrates one embodiment of a grey water system installed in a typical residential restroom.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

This present invention relates to a grey water system. In one embodiment, the grey water system has a form factor sufficient to fit the bulk of the system below an average sized washroom vanity 10 as might be found in a typical residential or small business location. As illustrated in FIG. 1, the system 1 includes a main assembly 100, a grey water transport system 200, and a grey water fill system 300. In one embodiment, the integrated mechanical components and electronics are contained in a singular device, main assembly 100, which acts as the reservoir 130, diverter (baffle 189) (to the normal waste drain), electronics and pump 143. In one embodiment, the main assembly 100 is positionable below the sink vanity 10 and has top mounted access areas for periodic servicing and for diagnostic viewing. The invention's control and fill devices have compact design so as to fit in a conventional gravity tank fixture 20 without being obtrusive. These components may be located remote from the main body 1, but in certain embodiments comprise a part of the grey water system 1.

In one embodiment, the present invention anticipates maximizing the available collection of grey water to a fixed amount per gravity water closet flush cycle while insuring no pump failure because of an empty grey water reservoir supply. The grey water system 1 provides for collection of grey water via main assembly 100, storage of the grey water via the main assembly 100, transportation of the grey water via the transport system 200 to a fixture filling end including the grey water fill system 300. The invention insures that at either end of the system, collection end (generally near a grey water source such as a sink vanity 10) or fixture tank filling end (generally near a gravity tank fixture 20), if extremes exist with the available supply of grey water (too much or too little), the system 1 will operate with no interruption to the normal operation of the integrated plumbing devices (sink lavatory 10 or gravity tank fixture 20) by utilizing a larger or smaller amount of fresh water to effectuate a flush (or to fill the flush reservoir). This invention incorporates novel mechanical design to make the installation truly flexible and low maintenance.

The balance between grey water and fresh water is dynamically adjusted depending on the availability of grey water while grey water storage is monitored based on the available capacity of the grey water storage reservoir 130. In one embodiment, electronic components, further described below, are provided that guard against modifying the system to using no grey water but actually only having the appearance of using grey water. Preferably, when periodic service is required, no residual inconvenience is experienced such as water overflow or pressure build-up in the reservoir. In one embodiment, the components that house the water treatment consumable are designed to extend the life of the consumable as well as offer some tamper proof mechanisms to thwart unintentional removal. In one embodiment, the invention uses a series of float switches which can supply input back to the electronics for decisions on the part of the system to maximize operation or alarm for needed service.

FIGS. 2A and 2B illustrate a housing 110 of the main assembly 100. The housing 110 provides a volume within which the grey water may be stored, such as in a grey water storage reservoir 130. The housing 110 may comprise an upper housing portion 111 engagable with a lower housing portion 112. A gasket 113 or other aid to sealing the interface between the upper housing portion 111 and the lower housing portion 112 may be provided.

The collection, filtering, and treatment main assembly 100 has, in one embodiment, a low profile to allow its integration into existing plumbing schemes such as below a washroom sink vanity 10. The main assembly 100 consists of subassemblies, including but not limited to a grey water storage reservoir 130, a pump cartridge assembly 140, and a consumable assembly 150 integrated into its space, along with attachment plumbing 180 (FIG. 5) that allows retrofitting to the existing waste piping. In one embodiment, the upper housing portion 111 includes a water storage intake 131, a pump cartridge opening 141, and a consumable assembly opening 151. The main assembly 100 may further include a filter 160, the upper housing portion 111, and a filter opening 161. In one embodiment, the main assembly 100 also forms the reservoir 130 for the storage of grey water. In an alternative embodiment, the grey water reservoir 130 is a subassembly disposed within the main assembly 100.

In one embodiment, one component within the main assembly is a pump cartridge assembly 140 which houses the electronic circuit board 142, the pump assembly 143, the reservoir float level sensor 144, and the pump outlet tube 145. The float level sensor 144 may be a traditional "float" type sensor used in tanks to determine the water level in the reservoir 130. Also included in main assembly 100 are routine serviceable components such as basket screen access cap 169, basket screen 163, consumable (such as a chlorine tablet) access cap 159. In certain embodiments, an overflow sensor 192 is located on the top of the main assembly 100. The power adapter 146 connects to the printed circuit board 118 which powers the pump and electronics. The main assembly 100 has an adaptable pump cartridge assembly 140 which allows the outlet water tube and wiring to be routed in four directions by simply removing the cover screws 105, rotating the pump cartridge assembly 140 and channeling the tubing and wires through either of the two molded channel ways 148 in the upper housing portion 111 or in the opposite direction. A pump cap 114 may be provided. In one embodiment, the pump cap 114 fits over the pump assembly 140 and allows the pump outlet tube 145 and power adapter 146 wires to extend from the pump assembly 140.

In a preferred embodiment, the function of the user sink 11 is not interrupted by the system of the present invention and the collection point of the system interposes itself into the sink drain line 13. The water from the sink 11 is diverted to fill the gravity tank 21 if it is not already full or the water will enter the main assembly for storage. If the main assembly 100 is at capacity (or at a predetermined capacity), grey water from the storage reservoir 130 exits via a waste drain. Thus, to the user of the sink, the presence of the system 1 does not appreciably impact the use of the sink 11.

Figure 5:
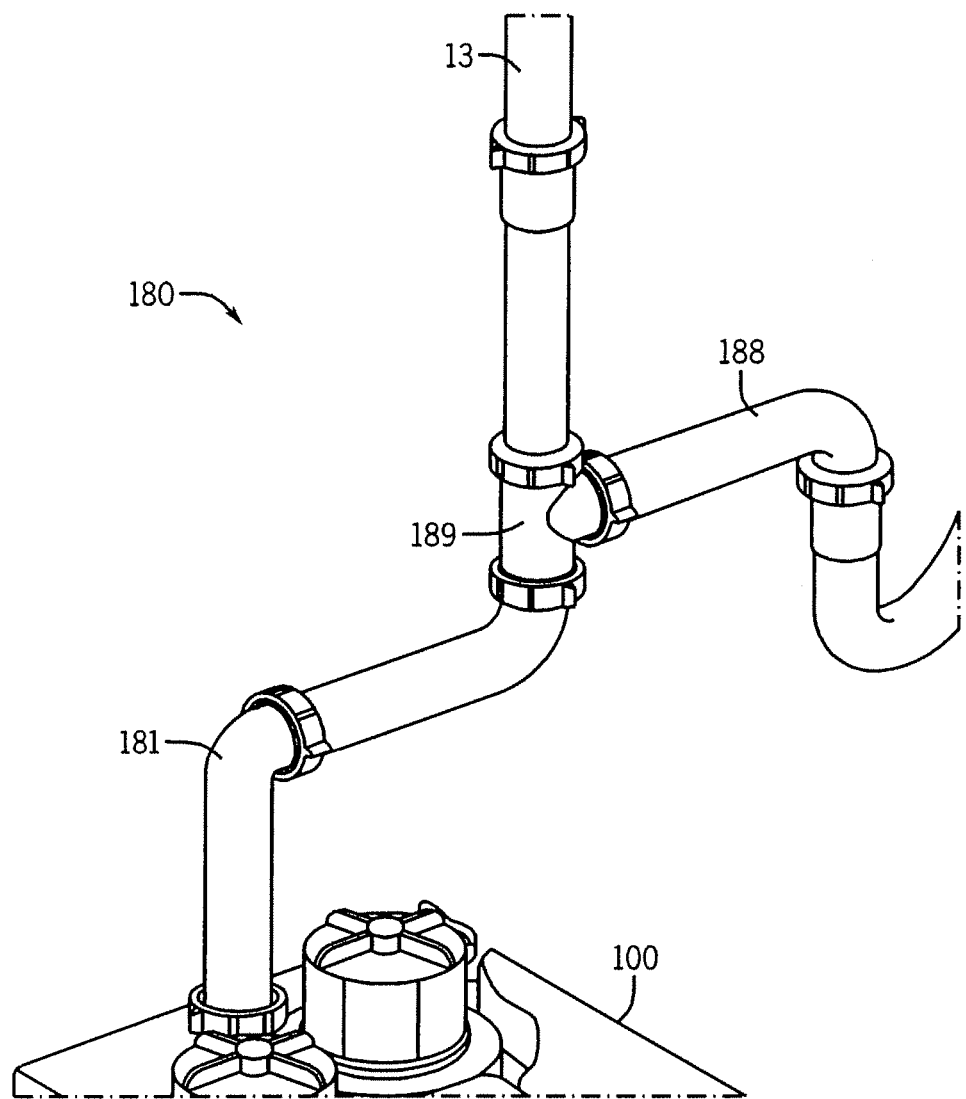
FIG. 5 illustrates the attachment plumbing for one embodiment of the invention.

As best shown in FIG. 5, system inlet piping 181 interposes the main assembly 100 between the sink drain tailpiece 13 and the waste drain tailpiece 188 which connects to the baffle tee 189. Also included with this system inlet piping is the baffle tee 189 that diverts water between the reservoir 130 and the waste drain line (not shown) through the wall.

The transport system 200 comprises a mechanism, such as conventional pipes, tubing, hoses, or the like, to connect the main assembly 100 with the fill system 300.

Figure 6:
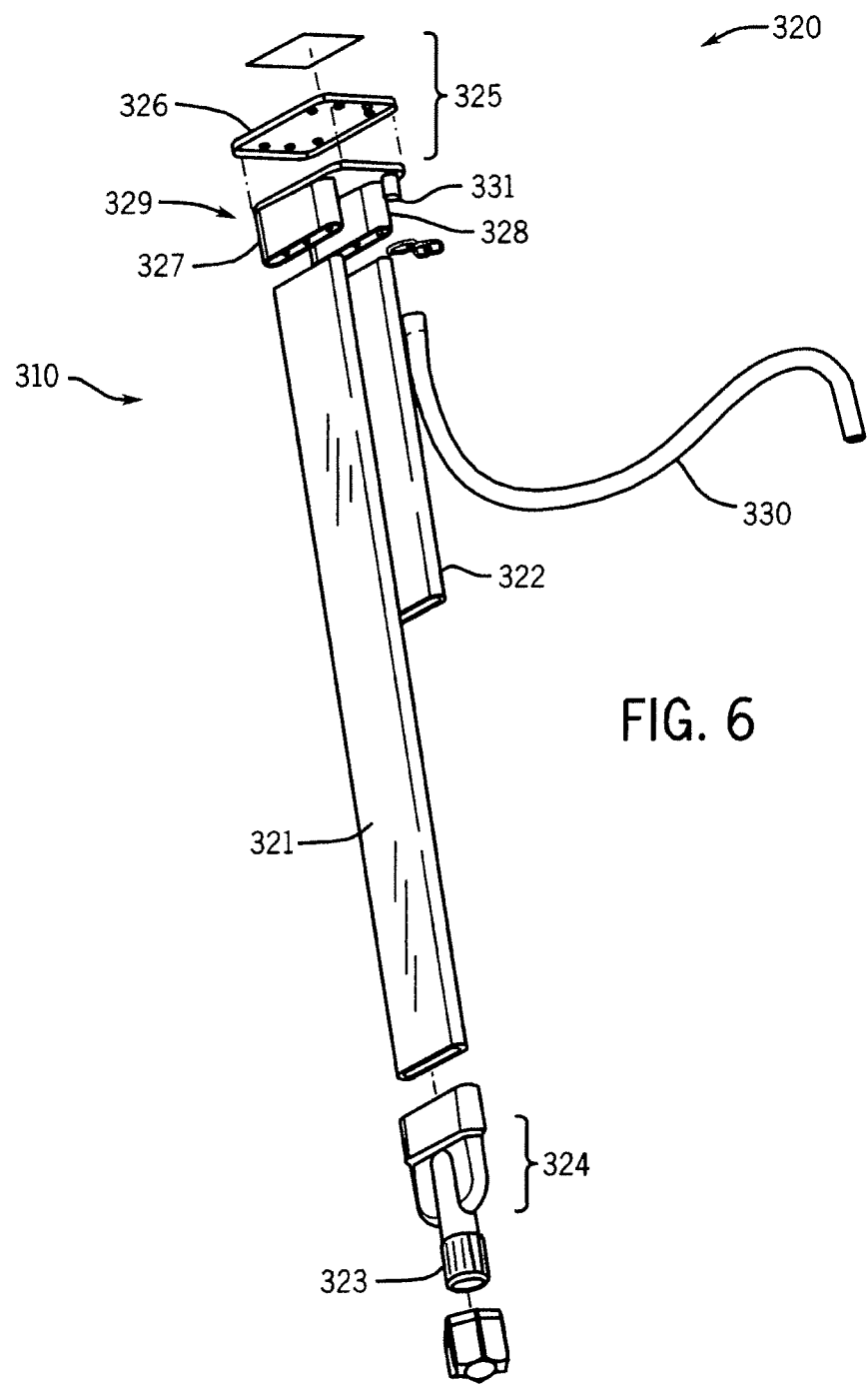
FIG. 6 illustrates one embodiment of a lid inlet assembly.
Figure 7:
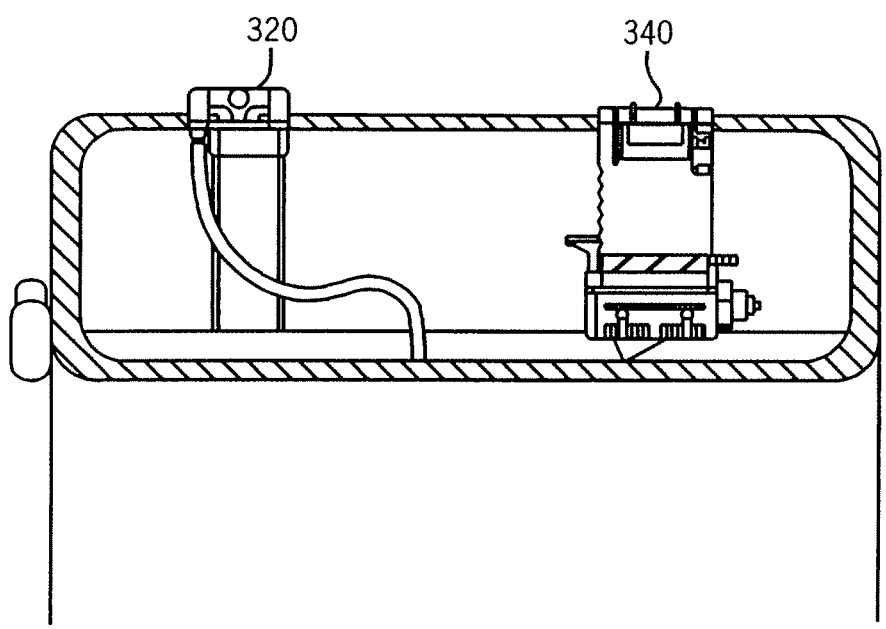
FIG. 7 illustrates the lid inlet assembly and the toilet tank water level sensor assembly positioned on a gravity tank.

The gravity tank assembly 310, positioned remote from the main assembly 100 in one embodiment, mounts into the inside of tank 21 of the gravity fixture 20. As best shown in FIG. 6, the gravity tank assembly 310 consists, in one embodiment, of a lid water inlet assembly 320, toilet tank water level sensor switch assembly 340 (FIG. 7), and flow regulator 350 (FIG. 1). It should be appreciated that many gravity fixture installations have clearance between a wall and a rear outside of the tank 21 of less than a fraction of an inch. Conventional diameter tubes can not fit within this space and can become constricted when trying to bend them over the top of the gravity tank. The lid inlet assembly 320 is designed with two main flat hollow portions 321, 322 parallel to each other and connected into a lid portion 325 with a gap distance between the hollow portions 321, 322 designed to straddle common residential grade gravity fixture thicknesses 23. The first flat hollow portion 321 extends from the inlet connection 323, or from an adaptor 324 configured to transition from the inlet connection 323 to the first flat hollow portion 321, to the lid portion 325 up the outside of the tank 21 between the tank and wall, in one embodiment. The first flat hollow portion 321 connects to the lid portion 325 which is in communication with the second flat hollow portion 322, which is directed into the tank 21. Thus, the main assembly 100 is in fluid communication with the tank 21.

The lid inlet assembly 320 has a standard round threaded inlet connection 323 on the outside of it down below the bottom of the tank 21. This round inlet quickly transitions into a slim square channel defined by the first flat hollow portion 321 so the water inlet can flow up the rear of the gravity tank 21 to the lid 325. The lid 325 may comprise a top plate 326 and a bottom plate 329, the plates 326, 329 engagable to form a chamber therebetween. The bottom plate 329 may have a first protrusion 327 for engaging the first flat hollow portion 321 and a second protrusion 328 for engaging the second flat hollow portion. In one embodiment, a refill tube 330 is provided, such as for engaging with a refill protrusion 331 on the bottom plate 329. The first protrusion, second protrusion, and refill protrusion 331 being in fluid communication with the chamber defined by the upper plate 326 and the lower plate 329. It should be appreciated that although the lid inlet assembly 320 is described as separate components, it could be a single unitary component without departing from the scope of the invention. The water transitions from the inlet connection 323 outside the gravity tank 21 over the top and down inside the tank 21. The water inlet 323 also allows for compact insertion into the gravity tank bowl 21 and flat portions 321, 322 to anchor onto the rear of the tank bowl. This flat construction for channeling the water allows for easy installation between small clearances of the water tank and finished walls.

Preferably, the top of the lid inlet assembly 320 is a minimal flatness to allow minimal rocking of tank covers when placed over the tank in the normal operating manner. In one embodiment, the present invention also allows all tubing to be concealed so as to be transparent from the conventional gravity toilet without a grey water recycling system.

The flow regulator 350 is mounted onto the inlet fitting of the fresh water line in order to control the water flow at a known restriction. This also allows more water from the grey water reservoir to be used every cycle. The flow regulator 350 reduces the fill rate of the fresh water allowing the grey water to provide a larger percentage of the water used to fill the tank 21 than would be present if no flow restriction was applied.

Along with the grey water supply hose 201, provided therewith may be leads from the gravity tank water level sensor 340. The wire leads from the gravity tank water level sensor have a quick disconnect just outside the gravity tank 21 for repair ease of the component. The transport system 200 places the gravity tank water level sensor 340 in communication with the main assembly 100. The gravity tank water level sensor 340 transmits its state to the main assembly 100. It should be appreciated, such transmission may also be wireless. In one embodiment, the toilet tank water level sensor switch assembly 340 has a mounting that allows the sensor to be adjusted to the top level of the water in the tank at which level the switch is caused to be closed. In one embodiment, a tank lid support (not shown) may be provided to support the tank lid in a manner similar to the lid 325 of the lid inlet assembly 320.

In a normal operation of using the gravity water closet 20 with the grey water recycling system installed, a user would evacuate the gravity water closet 20 as normal. When the gravity fixture 20 is flushed the water level in the tank 21 lowers, opening switch assembly 340 which transmits a signal to the main assembly 100. In response to the signal, the main assembly sends grey water, via the transport system 200, to the lid inlet assembly 320 and into the tank 21. If available, the water is pumped from the main reservoir 130 through transport system 200 into the gravity tank water inlet assembly 320. This pumped grey water from the reservoir 130 supplements the fresh water mechanically filling the tank 21 through the flow regulator 350 into the gravity fixture 21. The gravity fixture 20 may include a traditional flush valve which shuts off, such as via a mechanical float as conventional gravity toilets 20 operate in the art.

In one embodiment, the flow regulator 350 is sized such that if there is ample grey water supply in the reservoir, approximately 60% of the flushing water is grey water and 40% is fresh water when supply is available. It should be appreciated that the relative amount of grey water to fresh water may be varied. Further, the flow regulator 350 may be provided with a variable aperture allowing a user to alter the flow rate (and thus the percentage of fresh water used) without the need for new hardware or removal of the flow regulator 350 from the water line. Flow regulator 350 can be sized to allow any practical combination of maximum grey water and minimum fresh water. The logic of the electronics on board the main housing determines if the pump should pump, (1) if the gravity fixture is calling for grey water, or (2) if the reservoir is overfilled with grey water supply. The matrix found in table 1 shows one embodiment of sensor (in this embodiment, switches) possibilities versus the logic of the system to determine the state condition.

TABLE 1

| Level Sensor 340 | Grey Water Float Sensor 144 | Grey Water Overflow Sensor 192 | State Condition |
|---|---|---|---|
| High | Low | Low | #1 No water closet flush, no water in reservoir. With overflow sensor 192 open water is in upper chamber, possible clog to flow in filter. |
| Low | High | Low | #2 water closet has flushed, pumping grey water to gravity tank, overflow sensor 192 is seeing water entering reservoir from sink. |
| Low | Low | High | #3 water closet has flushed, no grey water to pump as there is no grey water available in the reservoir. |
| High | Low | High | #4 water closet has not flushed, no grey water to pump as there is no grey water available in the reservoir. |
| High | High | Low | #5 Water closet has not flushed, enough grey water in reservoir for a flush. With overflow sensor 192 too much water in reservoir will turn pump on until overflow sensor 192 goes high. |
| Low | High | High | #6 Water closet has flushed, enough water in reservoir so pump will turn on. |
| Low | Low | Low | #7 Water closet has flushed, no grey water supply in reservoir, therefore no pump turns on. With overflow sensor 192 open water is in upper chamber, possible clog to flow in filter. |
| High | High | High | #8 Water closet has not flushed, there is grey water in reservoir, no water in upper chamber. |

*High is closed switch, Low is open switch for embodiments where the sensors are switches.

The drain water from above the sink 11 is captured within the grey water storage reservoir 130. The connection point from the sink drain tailpiece 188 into the tank inlet is located at the baffle tee 189. The grey water from the sink 11 enters the reservoir 130 through the inlet 131. If the reservoir 130 is full, the baffle 189 operates to divert unneeded drain water from the sink 11 into waste drain tail piece 188 and into the waste line. The baffle tee 189 allows for some sink drain water to pass through the waste drain out through the drain line and for some of the water to pass into the system reservoir 130. Should the system reservoir ever fill up because of failure of any of the system components, the baffle tee 189 will allow water to flow out into the waste system drain just as if the grey system was not attached. In one embodiment, a reservoir overflow sensor 192 is provided. The overflow sensor 192 senses if the reservoir 130 fills up to a predetermined level, such as the position of the fill sensor at the top of reservoir 130. When the overflow sensor 192 senses that the reservoir 130 is full, a pump assembly 143 is turned on to pump water out of the reservoir 130 through the transport system 200 to the gravity fixture tank 21. This embodiment insures that if the sink 11 is used more often than the water closet 20 and the reservoir 130 becomes overfilled, the water level in the reservoir 130 will never overflow even if the main assembly is exposed, such as by removal of a pump cartridge assembly 140, a consumable assembly opening access cap 159 for servicing or a filter cartridge cover 169. The overflow sensor 192 is located below the cover openings 169 and 159. The overflow sensor 192 is mounted at an angle through the cover housing in order for the paddle on the switch to float.

In one embodiment, the present invention utilizes as a consumable a disinfectant, for example chlorine tablets, to treat the water in the grey water reservoir 130. The present invention addresses deficiencies in prior art designs that use consumable chlorine tablets as a disinfecting means.

Figure 4A:
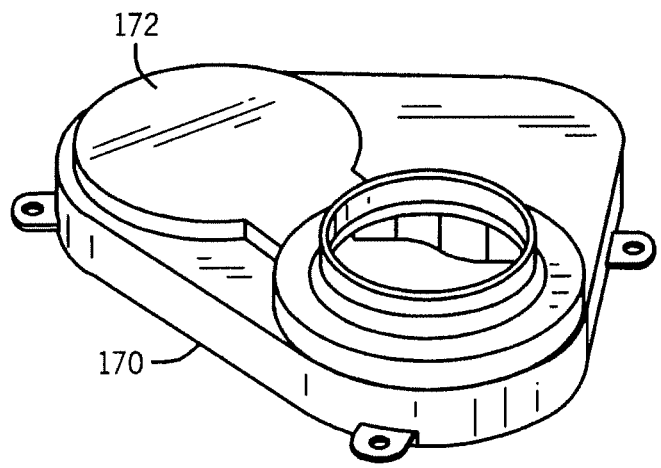
FIG. 4A is a top perspective view of a tank tray.
Figure 4B:
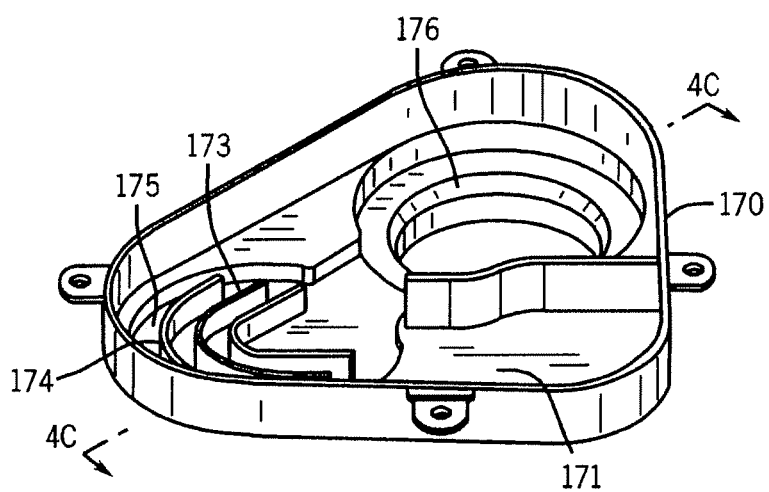
FIG. 4B is a bottom perspective view of the tank tray of FIG. 4A.
Figure 4C:
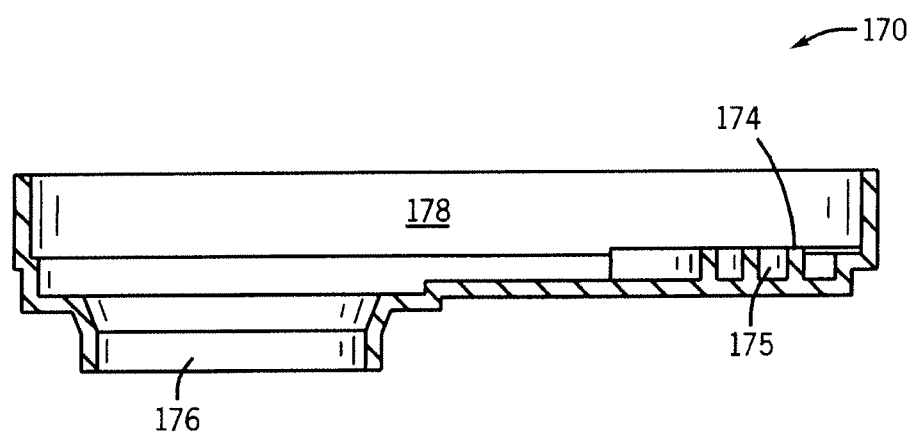
FIG. 4C is a cross sectional view of the tank tray of FIG. 4A along line 4C-4C (FIG. 4A).

FIGS. 4A-4C illustrate a main assembly tray 170. The main assembly tray 170 forms, along with the interior surface (not shown) of the upper housing portion 111, a channel 178 for the grey water to enter the storage reservoir 130. In the embodiment of FIGS. 4A-4C, the tray 170 is coupled to the upper housing portion 111 and disposed within the main assembly. The tray includes a grey water inlet 171, which is positioned below the water storage inlet 131. A consumable portion 172 is provided that allows for the flow of water through the tray 170 to pass over the consumable, such as a chlorine tablet. In one embodiment, the consumable portion 172 includes a raised portion 174 and/or recessed portions 175 to provide a platform 173 on which the consumable may be set. The consumable portion 172 is disposed beneath the consumable assembly opening 151, thus the consumable may be inserted into the main assembly 100 by insertion into the tray 170, on the platform 173, through the consumable assembly opening. In one embodiment, a consumable holder 155 is provided for insertion into the tray 170 to assist in retaining consumables, such as a stack of chlorine tablets. Rather than simply allowing the chlorine tablets to lie in the water path of incoming sink drain water, in this embodiment the platform 173 keeps the solid tablets from sitting in residual water following intake of grey water thus reducing the service life between changes. The tray 170 further includes a filter opening 176. The filter 160 is insertable through the tray filter opening 176. The filter 160 is positioned to receive grey water from the channel defined by the tray 170 and the upper housing portion 111. The grey water travels into the channel 178 over the consumables and into the filter 160 and then to the storage reservoir 130.

In one embodiment, the present invention also provides cap latches 197 integral to basket screen cap 169 and chlorine tablet access cap 159. These cap latches 197 cause the cap 169/159 to be difficult to remove for the unacquainted or small children tampering with the device. The cap latch 197 must be depressed during the unscrewing operation of removing the access caps. Failure to depress them causes the protruding latch to interfere with the multiple locking ribs located laterally on the respective access holes. The ribs are purposely located to interfere with the protruding latch as it revolves about the threads. The protruding latch geometry has a slight cam on the opposite side so that when the cap is tightened, the protruding latch "cams" over the locking ribs so the release button need not be depressed.

The above-described system allows for a diagnostics method for managing the grey water usage. By using the a flow restrictor, sensor information and some timing tables based upon a known flow control connected to the fresh water supply, the amount of grey water used can be maximized without interrupting the service provided to a user. Knowing the pump 143 capacity and transport system diameter, a logical table can be constructed within the logic program to determine several key elements as would be understood by one of ordinary skill.

In one embodiment, the system can detect if the flow regulator 350 is missing from the system. For example, in one embodiment, if the flow regulator 350 is installed it should take over 20 seconds to fill a 1.3 gpf toilet. If the flow restrictor 350 is disabled or removed the toilet tank will be refilled in under 20 seconds. Logic and the water level sensors can be used in the following way to make such a determination. If the tank water level sensor switch 340 detects a flush (i.e., water level goes down below sensor) and the reservoir float level sensor 144 shows there is reservoir grey water (table 1 state condition #2 or #6) then time how long the tank water level sensor switch 340 takes to reset (total time tank water level sensor switch 340 is low). If the time is under 15 seconds (15 second time is an example only) then the flow regulator 350 may be missing or disabled.

In one embodiment, the system can detect if the toilet is leaking. A leaky toilet will leak at a constant rate. When enough water has leaked out the storage reservoir 130 will be called on to fill the gravity tank 21 back up. The logic can register a flush and time how long it is until the next flush. If the electronics registers the time between flushes and tells, over a period of time, that the time between flush signals is the same +/−%, then it is likely that the system is detecting a leaky toilet. Normal toilet use would not be cyclically repeatable.

In another embodiment, the invention provides the ability to "grade" the effectiveness of the gray water system. In accordance with one embodiment, it will be known:
i. when a flush happens,
ii. if the refill of the flush is 0% grey water (no grey water in reservoir or state condition #7 in table 1),
iii. if the refill is 60-70%% grey water, then Grey water was available in the tank and pumped during the entire flush, state condition #2 and #6 in table 1, with the combination of the flow restrictor the refill percentage is 60%-70%,
iv. if the refill is some percentage of the refill-grey water was in the reservoir and pumped for the start of the refill but the grey water ran out before the gravity tank was refilled. The timing of the pump shut off because float sensor 144 went low (opened) before tank water level sensor switch 340 went high (closed).

Using this refill data based on the 2 level data of float sensor 144 and tank water level sensor switch 340, the flow rate of the pump, and the flow regulator 350, systems of the present invention can, in one embodiment, indicate on a graded scale how effective the system is at reducing fresh water in the flush.

In one embodiment, it can be determined if the pump or pump line is clogging. Filling the toilet tank with grey water should take approximately 1/3 of the time it takes to refill the toilet when there is no grey water. If this time ratio becomes 1/2 or 2/3 we can assume that the pumping system is ineffective for some reason. This also tells us if the grey water ratio, which should be between 60%-70%, is being compromised.

In one embodiment, the specific grey water to fresh water ratio for each installation can be determined. The electronics can time how long it takes for the toilet tank to be refilled when only fresh water is used (it will know when no grey water is available). The system can also time how long it takes to refill the toilet when grey water is pumped during the entire refill cycle. These 2 times should return a grey water refill percentage.

It should be appreciated that the principles of the present invention may be applied to systems having a water source for filling a tank. The toilet tank water level sensor 340 may be used to close a valve or a solenoid or other control mechanism to cease the supply of water to the tank 21.

Any of these combinations of alarms or alerts can be translated into multiple color LED or audible sounds from the main assembly electronics. In another embodiment, the signals can be input into a larger monitoring system and broadcast to interested parties wanting to know each system's reuse factor or when some routine maintenance may be needed.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for managing grey water collected from a grey water source and regulating the amount of collected grey water and freshwater from a freshwater source provided to a flush tank, comprising:
a main assembly having:
a housing, the housing defining a grey water reservoir and having a water storage inlet;
a consumable assembly at least partially disposed within the housing in fluid communication with the inlet;
a filter assembly at least partially disposed within the housing and in fluid communication with the consumable assembly;
a pump cartridge assembly including a pump assembly at least partially disposable in the housing and in fluid communication with the grey water reservoir;
an outlet port configured to deliver pumped water from the grey water reservoir; and
a float sensor for providing information regarding the level of grey water in the reservoir;
a lid water inlet assembly coupled to the main assembly by a grey water transport system, the lid water inlet assembly configured to transfer grey water from the main assembly into the flush tank, the lid water inlet assembly includes a first hollow portion in communication with the main assembly, a lid portion for receiving the first hollow portion and straddling a portion of the flush tank, and a second hollow portion extending from the lid portion into the flush tank; and
a flush tank water level sensor coupled to the main for communicating information regarding the volume of water in the flush tank;
wherein grey water passes from the inlet through the consumable assembly and through the filter assembly before entering the grey water reservoir.

2. The system of claim 1, further comprising an overflow sensor positioned within the housing and configured to detect when the grey water reservoir is at a predetermined volume of grey water, the overflow sensor in communication with the pump wherein the pump is activated to remove water from the grey water reservoir when the predetermined volume of grey water is sensed.

3. The system of claim 1, further comprising a flow regulator positioned on the fresh water source, wherein the flow regulator reduces the flow rate of the fresh water to the flush tank and grey water is pumped through the discharge tube to the lid water inlet assembly to mix with the fresh water in the flush tank.

4. The system of claim 1, further comprising a main assembly tray coupled to an upper housing portion of the housing to define a channel.

5. The system of claim 4, wherein at least a portion of the consumable assembly disposed within the channel and the filter in fluid communication with the channel such that grey water flows from the inlet through the channel and the portion of the consumable assembly into the filter assembly.

6. A method of controlling the supply of grey water from a grey water source and fresh water from a fresh water source for use in flush tank, comprising:
 receiving flush tank level information from a flush tank water level sensor regarding the level of water in the flush tank;
 determining when a flush event has occurred based upon the flush tank level information;
 receiving grey water storage reservoir information from a reservoir level sensor;
 determining if grey water is present in a grey water storage reservoir; and
 pumping grey water to the flush tank from the storage reservoir if a flush event is determined to have occurred and if grey water is determined to be present;
 determining if the flow of freshwater is not restricted by:
  upon a flush event being detected, starting a timer;
  stopping the timer upon receiving information indicating the flush tank has refilled;
  if the elapsed time is less than a predetermined time period, then an indication that the flow regulator is missing is provided
 restricting a flow of freshwater to the flush tank.

7. The method of claim 6, further comprising a determining if the flush tank is leaking.

8. The method of claim 6, further comprising a method of grading the effectiveness of the grey water system, comprising:
 determining when a flush event has occurred;
 determining if the grey water level is sufficient; and
 providing an indication of the effectiveness of the grey water system based upon the sufficiency of the grey water level.

9. The method of claim 6, further comprising diverting grey water to a waste line when the grey water reservoir is full.

10. The method of claim 6, further comprising receiving storage reservoir overflow information and pumping grey water from the storage reservoir to the flush tank.

11. A system for managing grey water provided to a flush tank comprising:
 a main assembly having:
  a housing, the housing defining a grey water reservoir and having a water storage inlet;
  a pump cartridge assembly including a pump assembly at least partially disposable in the housing and in fluid communication with the grey water reservoir;
  an overflow sensor configured to sense when the grey water reservoir is filled above a threshold; and
  an outlet port configured to deliver pumped water from the grey water reservoir;
  a float sensor for providing information regarding the level of grey water in the reservoir;
 a main assembly tray coupled to an upper housing portion of the housing to define a channel;
 a lid water inlet assembly coupled to the main assembly by a grey water transport system, the lid water inlet assembly having a first hollow portion in communication with the main assembly, a lid portion for receiving the first hollow portion and straddling a portion of the flush tank, and a second hollow portion extending from the lid portion into the flush tank, the lid water inlet assembly configured to transfer grey water from the main assembly into the flush tank;
 a flush tank water level sensor coupled to the main for communicating information regarding the volume of water in the flush tank.

12. The system of claim 11, a consumable assembly at least partially disposed within the housing in fluid communication with the inlet.

13. The system of claim 12, a filter assembly at least partially disposed within the housing and in fluid communication with the consumable assembly wherein grey water passes from the inlet through the consumable assembly and through the filter assembly before entering the grey water reservoir.

14. The system of claim 11, wherein at least a portion of the consumable assembly disposed within the channel and the filter in fluid communication with the channel such that grey water flows from the inlet through the channel and the portion of the consumable assembly into the filter assembly.

15. The system of claim 1, further comprising an adjustable pump cartridge cover being engageable with the housing and allowing the pump to be oriented in a plurality of orientations.

16. The system of claim 1, wherein the first hollow portion and the second hollow portion are flat.

17. The system of claim 16, wherein the first flat hollow portion is parallel with the second flat hollow portion.

* * * * *